April 26, 1966    I. B. POLEVITZKY    3,247,815
SYSTEMS AND METHODS FOR REPRODUCING COLORED PATTERNS
IN CARPETS AND OTHER MANUFACTURED ARTICLES
Filed Nov. 6, 1962    9 Sheets-Sheet 2
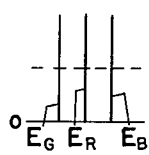
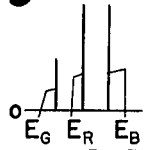
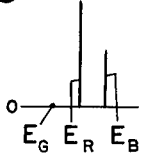
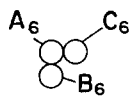
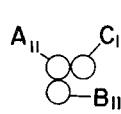
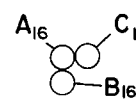
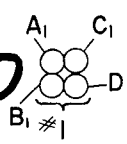
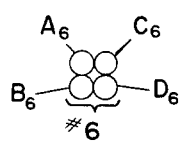
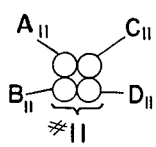
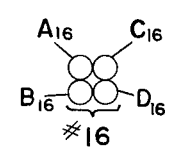
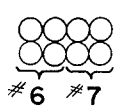
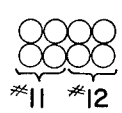
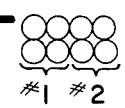
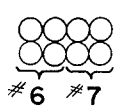
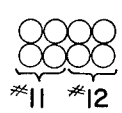
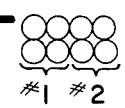
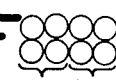
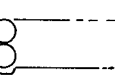
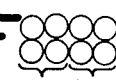
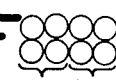
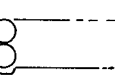
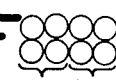

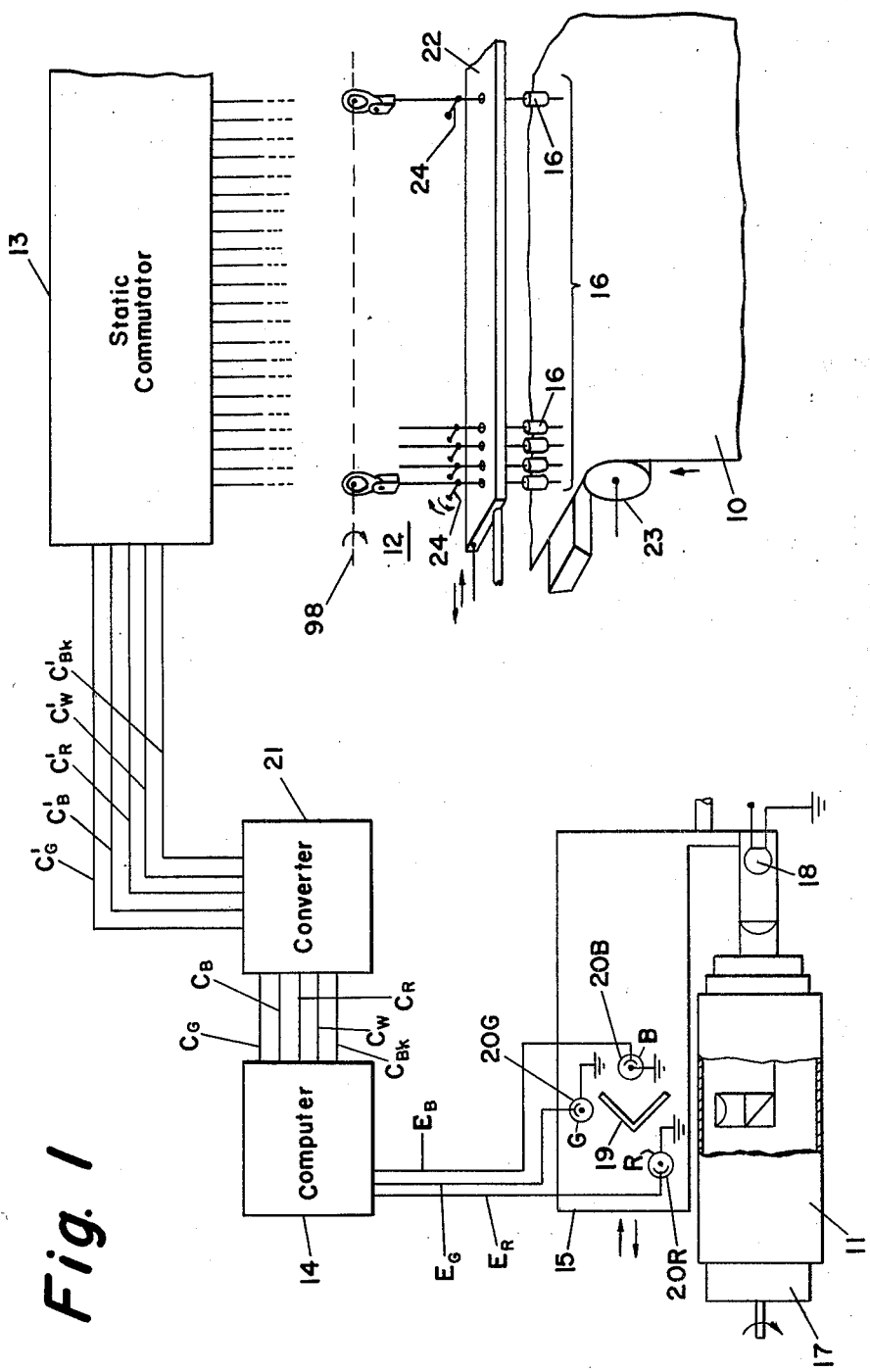

April 26, 1966    I. B. POLEVITZKY    3,247,815
SYSTEMS AND METHODS FOR REPRODUCING COLORED PATTERNS
IN CARPETS AND OTHER MANUFACTURED ARTICLES
Filed Nov. 6, 1962

United States Patent Office 3,247,815
Patented Apr. 26, 1966

3,247,815
SYSTEMS AND METHODS FOR REPRODUCING COLORED PATTERNS IN CARPETS AND OTHER MANUFACTURED ARTICLES
Igor B. Polevitzky, Miami, Fla., assignor to Image Designs, Inc., New York, N.Y., a corporation of New York
Filed Nov. 6, 1962, Ser. No. 235,770
20 Claims. (Cl. 112—79)

This invention relates to systems and methods for automatically reproducing in a manufactured product, such as a carpet, rug or tapestry for example, the color and design of a photograph, painting or other master pattern, usually of smaller size than its reproduced counterpart.

In accordance with the present invention, the "elemental" areas of the product are each formed by the application to a backing element of "bits" or subelements of basic colored materials in combinations of color bits having essentially the same visual effect as the corresponding elemental area of the pattern. Colors of the available bits may be and preferably are few in number, for example, green, red, blue preferably with white and/or black for an enhanced fineness of reproduction; a further and substantial increase in the number of reproduced color may be obtained by additonally including magenta, cyan and yellow. The number of bits per elemental area of the product may also be few in number, for example, three or four, but suffice with the selected few basic color materials to yield a large number of possible colors or color effects per elemental area of the product. The number of bits per elemental area and the number of basic colored materials are pre-chosen in the design of a particular system, but the colors of the bits which are to define a given elemental area of the product are electronically computed from a color analysis of the corresponding master pattern area and are translated into control signals for the devices which apply the color bits.

Further in accordance with the invention, signals resulting from sequential scanning of a series of elemental pattern areas are stored during scanning and then transferred in groups, in a color-bit sequence or a position-bit sequence, to all of the material-applying devices while in their charging position or state. More particularly, such devices correspond in number to the elemental pattern areas and all are concurrently moved to material-applying positions which in number correspond to the number of bits per elemental area of the product. For each of such positions, all of the devices apply a color bit each to one of the elemental areas of the product so that upon utilization of all stored signals for a one-line scan of the pattern, each of the incremental areas of a corresponding line of the product has a color value and position closely approximating that of the corresponding incremental area of the pattern.

More specifically, and in a preferred system, each line of the master is repeatedly scanned. For each scan, there is obtained color bit information for a series of elemental areas equally spaced along the line. In the successive scans of the same line, each series of scanned areas is displaced with respect to the previously scanned areas to obtain new bit information until all of the required bit information has been obtained for every elemental area of a line of the master pattern.

The invention also resides in electronic circuitry which resolves the light from each elemental area of the pattern into analog values of color components of such light and converts such analog values into digital values for computation and storage of color-bit signals utilized by the corresponding material-applying device to apply that combination of color bits to an elemental area of the product.

For optimizing the speed of production, the invention further resides in electronic control circuitry which correlates the scanning of the pattern to the operating mechanism for the material-applying devices to provide for actuation of the latter in proper timed relation to the stored control signals and to provide for the concurrent analysis and computation of the control signal next to be utilized.

The invention further resides in a system having the features of combination, construction and arrangement hereinafter described and claimed.

For a more detailed understanding of the invention, reference is made to the following description of systems embodying it and to the attached drawings in which:

FIG. 1 schematically shows a system for manufacturing rugs, carpets or the like in accordance with control signals computed from analysis of light from a master pattern;

FIGS. 2A–2F are explanatory figures referred to in discussion of the determination, from the analysis of the light from an elemental area of the master, of the particular color subelements or bits selected for the corresponding elemental area of the carpet or other manufactured article;

FIG. 3 shows the arrangement of sheets having FIGS. 4 to 9 thereon for interconnection of these figures to form a complete system;

FIG. 4 is a block diagram of a computer for converting signals corresponding with the magnitude of the light components from an area of the master pattern to analog control signals;

FIGS. 11A–11F are explanatory figures referred to in discussion of FIG. 6; and

Figure 5:
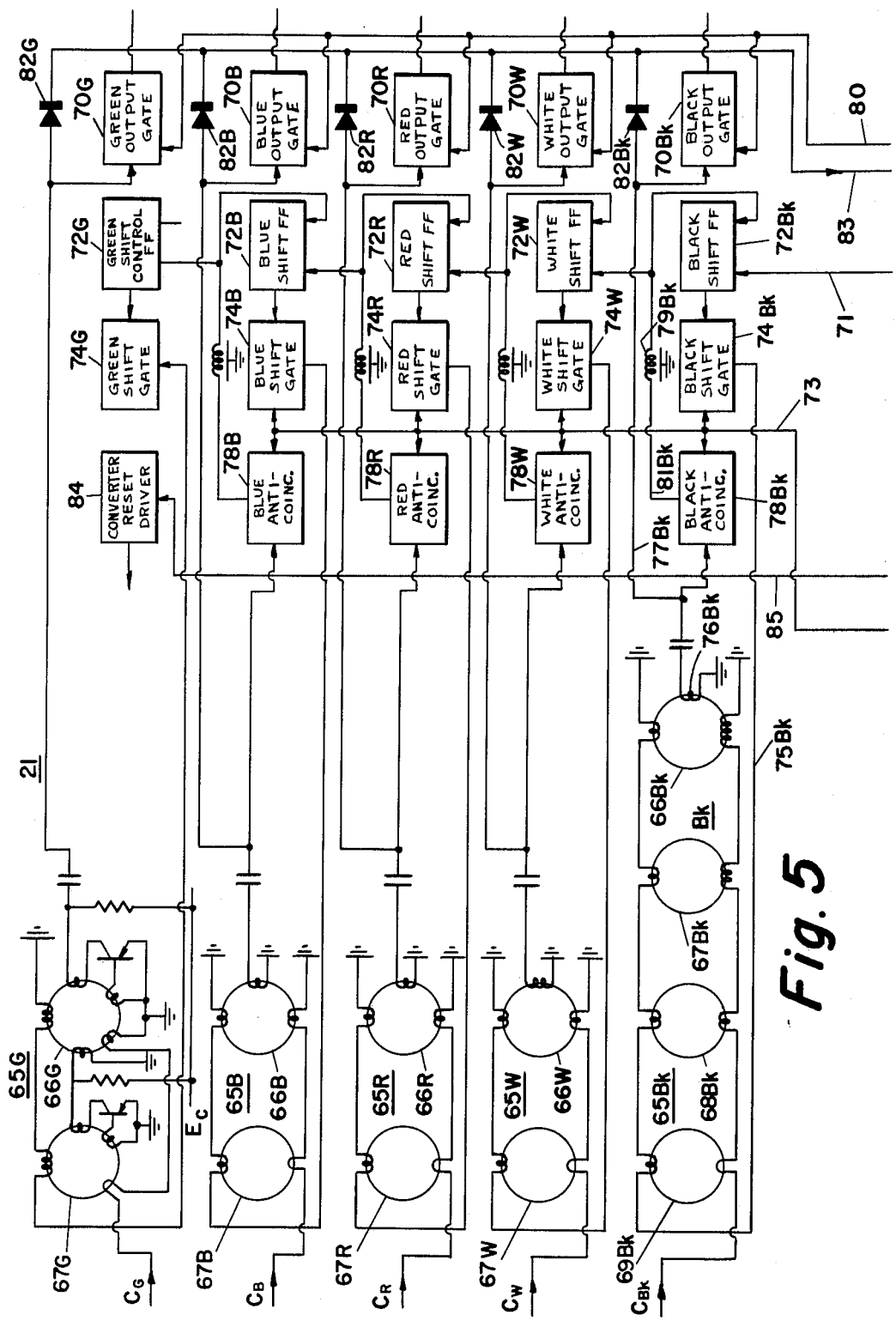
FIG. 5 is a block diagram of an arrangement for converting the analog control signals of FIG. 4 to digital form.

The objective of the system shown in FIG. 1 is the faithful reproduction in manufactured product 10, such as a tapestry, rug, carpet, mosaic, terrazzo or the like, of the arbitrary and generally non-repetitive design of a color photograph, picture or other graphic master pattern 11. For simplicity and clarity of explanation, the following description is particularly directed to the manufacture of carpet whose pattern subelements are bits of colored yarn. A significant feature of the system is the independence between the speed of generation of information signals required for reproduction of the pattern and the speed of operation of the mechanism 12 which effects the tufting or laying process. Such independence is obtained by storage in a commutated memory device 13 of information signals computed by the analyzer 14 for each elemental area of the master 11, from the output of the scanning means 15. The scanner 15 may be generally similar to that disclosed in my copending application, Serial No. 108,633, filed May 8, 1961, now Patent No. 3,181,987.

The input signals from the elemental areas of a line of the pattern 11 are serially produced at high speed and stored. In each cycle of the more slowly operating bit-applying mechanism 12, the signals stored in the memory device 13 are transferred in parallel to the mechanism 12 for concurrent application to elemental areas of the carpet 10 of bits of yarn whose color has been determined from the corresponding scanned elemental areas of the pattern. For each cycle of mechanism 12, when of the type disclosed in my copending application Serial No. 194,426, all of the heads 16 are multi-needle heads and concurrently apply a color tuft, each head according to the particular needle selected by its individual control signal as transferred thereto from the storage device 13. As another alternative, the tufting mechanism 12 may be of the type disclosed in my application Serial No. 250,901, filed January 11, 1963. In either case during such parallel utilization of one set of control signals by the mechanism 12, the next set of control signals therefore is being serially produced by the scanner 15 and computer 14. Since the time required for scanning a line and storing the computed control signals is very small, of the order of milliseconds, the speed at which a linear yard of carpet can be produced is dictated by the permissible speed of the fit-applying mechanism with due allowance for the number of colors that can be reproduced per elemental area of the carpet. As will later become clear, the number of colors or color effects that can be reproduced depends upon the number of colors made available as loops, tufts or other bits of yarn and upon the prechosen number of bits per elemental area of the carpet.

It is here to be noted that an "elemental" area of the carpet or other manufactured product is that which subtends a small arc, about 2 minutes at the usual viewing distance: for a rug or carpet, this corresponds with an elemental area of about ¼" x ¼". For such elemental area formed by differently colored bits or tufts, the eye cannot resolve the colors of the individual subelements or bits but receives the visual impression of a single reproduced color: for example, assuming an elemental area consists of two red tufts and two blue tufts, the observed color is purple. With only a relatively few colors as subelements, it is possible to reproduce a much larger number of colors for an elemental area. A substantial number of colors can be reproduced using only red, green and blue yarn: the number can be substantially increased by additionally providing bits of white and/or black yarn: and can be further substantially extended by additionally providing magenta, cyan and yellow yarn. With only four bits per elemental area and using only five colored yarns, specifically red, green, blue, white and black, twenty-seven different colors can be reproduced as later shown in Table A. For the same number of subelement colors but with six bits per elemental area, the number of possible elemental area colors is increased to sixty-four. By additionally providing magenta, cyan and yellow for example, the number of reproducible colors is increased to 125 for 4 bits per elemental area and to 343 for 6 bits per elemental area.

In all of the foregoing cases, the control signals which determine the selection of color bits for a particular elemental area of carpet 10 are derived by resolving the light from the corresponding area of the master 11 into its primary components and then computing from the relative magnitudes of such components which color or colors of yarn are to be selected and how many bits of each.

Specifically in the system of FIG. 1, the master pattern 11 is in the form of a color transparency wrapped on a transparent drum 17. The light passing through an elemental area of the pattern from the light source 18 is separated by the dichroic mirror 19, or equivalent beam-splitter, into its red, blue and green components. These component beams respectively activate the photomultiplier tubes 20R, 20B and 20G respectively to generate signals $E_R$, $E_B$, $E_G$ proportional to the red, blue and green content of the light from such elemental area of the master 11.

The color of the tufts to be selected for subelements of the corresponding area of the carpet may be determined by computer 14 from the relative magnitudes of the signals $E_R$, $E_B$, $E_G$ which are normalized so that the transmission of white light corresponds with equality of the signals $E_R$, $E_B$, $E_G$: such normalization may be effected by selection of proper filters dependent upon the spectral response of the photocells and the effects of the dichroic mirror.

For the simple assumed case represented by FIG. 2A, the transmission to the scanner unit 15 of two arbitrary units of white light results in production of $E_R$, $E_G$ and $E_B$ signals, all having a magnitude of two arbitrary units. This color can be reproduced in a corresponding elemental area of the pattern (FIG. 2B) by applying one white tuft, one red tuft, one blue tuft and one green tuft, the relative color density of the red, blue and green tufts having been selected to produce, as viewed in white light, the visual impression of white. If as shown in FIG. 2C the $E_R$ and $E_B$ signals are of the same magnitude as assumed before but $E_G$ has only a magnitude of one, the unsaturated purple of an elemental area of the master 11 is reproduced in the corresponding elemental area of the carpet by one blue tuft, one red tuft, one white tuft and one black tuft (FIG. 2D). If as shown in FIG. 2E the $E_G$, $E_R$ and $E_B$ signals respectively have the values of 0, 2 and 1, the bluish red color is reproduced by applying two red tufts, one blue tuft and one black tuft (FIG. 2F) to form the corresponding elemental area of the rug. From Table A below, which includes the foregoing examples, can be seen the code which provides twenty-seven reproduced color combinations from five colored yarns and for four bits per elemental area.

*Table A*

| Signals | | | Color Bits | | | | |
|---|---|---|---|---|---|---|---|
| $E_G$ | $E_R$ | $E_B$ | $N_g$ | $N_r$ | $N_b$ | $N_w$ | $N_{bk}$ |
| 0 | 0 | 0 | 0 | 0 | 0 | 0 | 4 |
| 1 | 0 | 0 | 1 | 0 | 0 | 0 | 3 |
| 2 | 0 | 0 | 2 | 0 | 0 | 0 | 2 |
| 0 | 1 | 0 | 0 | 1 | 0 | 0 | 3 |
| 0 | 2 | 0 | 0 | 2 | 0 | 0 | 2 |
| 0 | 0 | 1 | 0 | 0 | 1 | 0 | 3 |
| 0 | 0 | 2 | 0 | 0 | 2 | 0 | 2 |
| 1 | 1 | 0 | 1 | 1 | 0 | 0 | 2 |
| 2 | 1 | 0 | 2 | 1 | 0 | 0 | 1 |
| 1 | 2 | 0 | 1 | 2 | 0 | 0 | 1 |
| 2 | 2 | 0 | 2 | 2 | 0 | 0 | 0 |
| 1 | 0 | 1 | 1 | 0 | 1 | 0 | 2 |
| 2 | 0 | 1 | 2 | 0 | 1 | 0 | 1 |
| 1 | 0 | 2 | 1 | 0 | 2 | 0 | 1 |
| 2 | 0 | 2 | 2 | 0 | 2 | 0 | 0 |
| 0 | 1 | 1 | 0 | 1 | 1 | 0 | 2 |
| 0 | 2 | 1 | 0 | 2 | 1 | 0 | 1 |
| 0 | 1 | 2 | 0 | 1 | 2 | 0 | 1 |
| 0 | 2 | 2 | 0 | 2 | 2 | 0 | 0 |
| 1 | 1 | 1 | 0 | 0 | 0 | 1 | 3 |
| 2 | 1 | 1 | 1 | 0 | 0 | 1 | 2 |
| 1 | 2 | 1 | 0 | 1 | 0 | 1 | 2 |
| 1 | 1 | 2 | 0 | 0 | 1 | 1 | 2 |
| 2 | 2 | 1 | 1 | 1 | 0 | 1 | 1 |
| 2 | 1 | 2 | 1 | 0 | 1 | 1 | 1 |
| 1 | 2 | 2 | 0 | 1 | 1 | 1 | 1 |
| 2 | 2 | 2 | 1 | 1 | 1 | 1 | 0 |

It will be noted from Table A that there are only three signals $E_G$, $E_R$, $E_B$ from the scanner 15 whereas five signals are necessary for control of application of the bits in the particular example under discussion. The white and black control signals $C_w$ and $C_{bk}$ (FIG. 1) are generated within the computer 14. These signals, as well as $C_G$, $C_R$, $C_B$ derived by computer 14 from the input signals $E_G$, $E_R$, $E_B$, are changed from analog to digital form by converter 21 for transfer to the storage device 13. It should here be noted that although for simplicity of explanation the scanner signals $E_G$, $E_R$, $E_B$ have been assigned discrete values of 0, 1 and 2 in Table A, each of these signals, being a continuous function of the intensity of the corresponding color component, may have any value from 0 to a maximum dependent upon the sensitivity of the photomultiplier.

In the computer arrangement of FIG. 4, which is suited for the 4-bit, 5-color subelement code of Table A, the $E_G$, $E_R$ and $E_B$ signals are respectively applied to the inverter-amplifiers 25G, 25R, 25B each of which produces positive and negative output signals proportional to the input signal. The positive output G of inverter 25G is applied as one of the inputs of adders 26, 27 and gate 28. The positive output R of inverter 25R is applied as one of the inputs of adders 29, 30 and gate 31. The positive output B of inverter 25B is applied as one of the inputs of adders 32, 33 and gate 34. The negative output (−G) of inverter 25G is applied as the second input of each of the adders 29 and 32. The negative output (−R) of inverter 25R is applied as the second input of each of the adders 26 and 33. The negative output (−B) of inverter-amplifier 25B is applied as the second input of each of the adders 27 and 30.

The output of the G–R adder 26 is applied as the sole input of the trigger circuit 35 and of the threshold circuit 36. The output of the G–B adder 27 is applied as the sole input of the trigger circuit 37 and of the threshold circuit 38.

The output of the R–G adder 29 is applied as the sole input of the trigger circuit 39 and of the threshold circuit 40. The output of the R–B adder 30 is applied as the sole input of the trigger circuit 41 and the threshold circuit 42. The output of the B–G adder 32 is applied as the sole input of trigger circuit 43 and of the threshold circuit 44. The output of the B–R adder 33 is applied as the sole input of the trigger circuit 45 and of the threshold circuit 46.

The output of the G–R trigger 35 is applied as one input of the gate 47 whose other input is the output of the B–R threshold circuit 46. The output of trigger circuit 35 is also applied as one input of gate 48 whose other input is supplied by the output of gate 31.

The output of the G–B trigger 37 is applied as the second input of gate 49 whose other input is supplied by the output of the R–B threshold circuit 42. The output of trigger 37 is also applied as one input of gate 50 whose other input is the output of gate 34.

The output of the R–G trigger 39 is applied as the second input of gate 51 whose other input is supplied by B–G threshold circuit 44. The output of trigger circuit 39 is also applied as one input of gate 52 whose other input is the output of gate 28.

The output of the R–B trigger 41 is applied as one input of gate 53 whose other input is the output of G–B threshold circuit 38. The output of trigger 41 is also applied as the second input of gate 34.

The output of the B–G trigger 43 is applied as one input of gate 54 whose other input is the output of the R–G threshold circuit 40. The output of trigger 43 is also applied as the second input of gate 28.

The output of the B–R trigger circuit 45 is applied as one input of gate 55 whose other input is the output of the G–R threshold circuit 36. The output of trigger 45 is also applied as the second input of gate 31.

The output circuits of the B–R gate 55 and the R–B gate 53 are connected to the adder 55G. If for concurrent magnitudes of $E_G$, $E_R$, $E_B$ the green signal is greater than the red signal and the blue signal exceeds the red signal, the gate 55 opens and passes to adder 55G a signal proportional of the extent, if any, to which the green signal exceeds the red signal. Thus if the signal $E_R$ is the smallest, the adder receives an input proportional to $E_G-E_R$ which are analog values whose difference is seldom a whole number whereas a control signal for determining how many green tufts are to appear in an elemental area of the carpet or other product must be an integer. To provide control signals which are integers, the output of the adder 55G is applied to a quantizing circuit 56G whose output has, for example, the three arbitrarily assigned levels 0, 1, 2 respectively produced for $E_G-E_R$ greater than zero but less than .66; $E_G-E_R$ equal to or greater than .66 but less than 1.3; $E_G-E_R$ from 1.3 to 2 (max.). The output of the quantizing circuit is applied to the "green" driver amplifier 57G and to the Not-black adder 55$\overline{Bk}$ in circuit with the "black" driver amplifier 57Bk.

If the blue signal is the smallest, the R–B gate 53 is opened and passes to the adder 56G a signal $E_G-E_B$ proportional to the extent, if any, by which the green signal exceeds the blue signal. The resultant output of the adder 56G is quantized by the circuit 56G before application to the green driver 57G and the adder 55$\overline{Bk}$.

In like manner, if the red component of the light from the scanned area exceeds both the green and blue components, neither of the latter being zero, either one or the other of gates 49, 54 is open. With the G–B gate 49 open, the adder 55R receives the output signal $E_R-E_B$ which after quantizing by circuit 56R is applied to the red driver amplifier 57R and adder 55$\overline{Bk}$. With the B–G gate 54 open, the adder 55R receives the output signal $E_R-E_G$ which after quantizing by circuit 56R is applied to the red driver amplifier 57R and adder 55$\overline{Bk}$.

Also in like manner, if $E_B$ is greater than $E_G$ and $E_R$, neither of the latter being zero, one or the other of gates 47, 51 is open. With G–R gate 47 open, the output signal $E_B-E_R$ of adder 33 is passed to adder 55B, quantized and applied to the "blue" driver amplifier 57B and to adder 55$\overline{Bk}$ in circuit with the "black" driver amplifier 57Bk.

When both the B–G gate 28 and the R–G gate 52 are open, the +G signal is passed to the "adder" circuit 55W and thence to the quantizer circuit 56W. The output of the "white" quantizer is applied to the "white" driver amplifier 57W and to the Not-black adder 55$\overline{Bk}$. When both the B–R gate 31 and the G–R gate are open, the +R signal is passed to the "white" adder circuit 55W and after being quantized is applied to the "white" driver amplifier 57W and to the Not-black adder 55$\overline{Bk}$. When both the R–B gate 34 and the G–B gate 50 are open, the +B signal is passed to the "white" adder 55W and thence to the quantizer 56W for application to the "white" driver 57W and the "Not-black" adder 55$\overline{Bk}$.

For any concurrent values of $E_G$, $E_R$, $E_B$, only one pair of the gates 28, 52; 31, 48; 34, 50 can be open. Hence, if $E_G$ is not zero but smaller than $E_R$ and $E_B$, the quantizer 56W produces a control signal calling for zero, one or two white tufts depending upon the magnitude of $E_G$. Similarly, if $E_R$ is not zero but smaller than $E_G$ and $E_B$, the quantizer 56W produces a control signal calling for zero, one or two white tufts depending upon the magnitude of $E_R$. Similarly, if $E_B$ is not zero but smaller than $E_R$ and $E_G$, the quantizer 56W produces a control signal calling for zero, one or two white tufts depending upon the magnitude of $E_B$. Stated briefly, the output of the "white" quantizer 56W is zero when little or no light received from the scanned area or when only two of the signals $E_G$, $E_R$, $E_B$ are of significant magnitude: and may be one or two when all three signals $E_G$, $E_R$, $E_B$ are of significant magnitude and in dependence upon the relative and absolute magnitudes of such signals.

The outputs of the quantizers 56G, 56R, 56B, 56W as applied to the Not-black adder 55$\overline{Bk}$ produce a negative output having the value of zero, one, two, three or four. This output is inverted by inverter 60 and applied effectively to reduce the output of the adder 61 which for zero output of the inverter 60 supplies to the "black" driver amplifier 57Bk through quantizer 56Bk a control signal calling for four black tufts as bits of an elemental area of the carpet or other manufactured product.

In brief résumé, for all concurrent values, including zero, of the three computer input signals $E_G$, $E_R$, $E_B$, there is produced a set of at least one and not more than four output signals $C_G$, $C_R$, $C_B$, $C_W$, $C_{Bk}$, each having a value, including zero, which determines the number of bits of corresponding color to be deposited in an elemental area of the manufactured article 10. The total or sum value of such output signal or signals corresponds with the prechosen number of bits per elemental area, i.e., 4 in the specific system shown.

For example, if all of the input signals $E_G$, $E_R$, $E_B$ are zero, none of the gates 47, 51; 49, 54; 53, 55; 48, 50, 52; is open and consequently no finite blue, red, green or white signals are passed by the quantizers 56B, 56R, 56G, 56W to either the drivers 57G, 57B, 57R, 57W or to the "non-black" adder 55$\overline{BK}$. Consequently, the quantizer 56Bk passes a black signal having the value of 4 to the "black" driver 57Bk. As another example, let it be assumed the computer input signals are $E_G=.7$; $E_R=.75$ and $E_B=1.8$. In such case, the output of quantizer 56G is zero because although the B–R gate 55 is open there is no input signal to it. The output of quantizer 56R is zero because although the B–G gate 54 is open, the difference signal $$(E_R - E_G = .05)$$

passed through it is so low that it converted to 0. The output of quantizer 56B is 1 because the R–G gate 51 is open and passes the excess blue signal ($E_B - E_G = 1.1$). With the B–G gate 28 and the R–G gate 52 open, the adder 55W receives a +G signal of 0.7. This is converted by quantizer 56W to a 1. With the non-black adder 55$\overline{BK}$ having a total input of 2 from quantizers 56B and 55W, the output of quantizer 56Bk is 2. Hence, for this case the output signals of the computer 14 call for 1 blue tuft, 1 white tuft and 2 black tufts (color 23 of Table A). The output signals produced by computer 14 for all other values of $E_G$, $E_R$, $E_B$ can similarly be traced from the circuitry of FIG. 4.

The converter 21 shown in FIG. 5 for converting the output signals $C_G$, $C_B$, $C_R$, $C_W$, $C_{Bk}$ of the computer 14 (FIG. 4) to digital form comprises the "green" register 65G, the "blue" register 65B, the "red" register 65R, the "white" register 65W and the "black" register 65Bk. All of these registers may be of the magnetic core type, the registers 65G, 65B, 65R, 65W having two cores each and the black register 65Bk having four cores in the particular converter shown in FIG. 5.

The input windings for the cores 66G, 67G of the green register 65G respectively have such number of turns that when signal $C_G$ has a value of 2, both cores are switched from the 0 state to the 1 state whereas when signal $C_G$ has a value of 1, only core 66G is switched to the 1 state. The input windings of the two cores of the blue, red and white registers are similarly proportioned, the corresponding cores being identified by the same reference number plus a suffix letter corresponding with the particular color. The input windings of the four cores of the black register 65K are so proportioned that when signal $C_{Bk}$ has a value of 4, all of cores 66Bk, 67Bk, 68Bk, 69Bk are switched to the 1 state; when signal $C_{Bk}$ has a value of 3, three cores 66Bk, 67Bk and 68Bk are switched to the 1 state; when signal $C_{Bk}$ has a value of 2, two cores 66Bk and 67Bk are switched to the 1 state; and when signal $C_{Bk}$ has a value of 1, only core 66Bk is switched to the 1 state.

Thus, for example, if for a particular elemental area of the master 11 the output of the computer 14 is $C_G=1$ and $C_{Bk}=3$, the core 66G of the green register 65G would be switched to the 1 state and the cores 66Bk, 67Bk and 68Bk would be switched to the 1 state.

The color-bit information stored in the cores of each of the shift-registers 65G–65Bk is transferred as a series of pulses to the memory or storage device 13 via the corresponding one of the output gates 70G–70Bk of the converter 21. As will appear, the registers 65G–65Bk are interrogated in sequence and after each register in turn has passed its 1's via the corresponding one of output gates 70G–70Bk to the memory device 13, the interrogation pulses are applied to the next register until all of the color bit information stored in this register for the interval between the scanning of successive elemental areas of the master 11 has been transferred to the memory device 13 for utilization, at the end of the line scan, by the tufting or other bit-applying mechanism 12.

More particularly, when the flip-flop circuit 72Bk is switched by a start pulse on line 71, its output enables one of the input circuits of the black shift-gate 74Bk. Thus, when a series of clock pulses are produced on line 73 as later described, the first pulse of the series enables the other input circuit of shift gate 74Bk to produce an interrogating pulse on line 75Bk which is coupled to all cores of the black register 65Bk.

If none of the cores of register 65Bk is in the 1 state, the output coil 76Bk on core 66Bk produces no output on the input line 77Bk of the black output gate 70Bk. Also, in such event, the black anti-coincidence circuit 78Bk is effective to produce an output pulse on line 81Bk which after a brief delay, of say 5 microseconds introduced by delay line 79Bk, is effective both to switch off the black flip-flop 72Bk to close the black shift gate 74Bk and to switch on the white flip-flop 72W to enable one input circuit of the white shift-gate 74W.

If on the other hand, one or more of the cores of register 65Bk is in the 1 state, the first clock pulse of the series as repeated as an interrogation pulse on line 75Bk is effective to produce an output pulse by the read-out coil 76Bk. Such output pulse as appearing on line 77Bk is passed by the black output gate 70Bk then open because of a pulse on line 80. Such output pulse of the read-out coil 76Bk as also applied to the anti-coincidence circuit 78Bk precludes it from resetting the black flip-flop 72Bk and turning on the white flip-flop 72W so that black register 65Bk will be again interrogated when the second clock pulse of the series appears on line 73 and is repeated as an interrogation pulse on line 75Bk of that shift register.

Assuming only core 66Bk of register 65Bk had been set to the 1 state by signal $C_{Bk}$ from the computer, the register was cleared by the first read-out so that when interrogated by the second pulse, its output coil 76Bk produces no signal for black output gate 70Bk. The anti-coincidence circuit 78Bk is therefore effective, as above described, to turn off the black shift gate 74Bk and to turn on the white shift gate 74W. From the foregoing, it will be understood that when two, three or four cores of register 65Bk have previously been set to the 1 state by signal $C_{Bk}$, the interrogation of that register continues until the corresponding number of pulses have been produced and applied to gate 70Bk. If the output count for the black register 65Bk is less than 4 (the number of bits per elemental area), the anti-coincidence circuit 78Bk is effective as above described to shift further interrogation to the white register 65W.

In like manner, the registers 65W, 65R, 65B and 65G are interrogated in that sequence with shift to the next as each is cleared until the total output count becomes 4. Since the corresponding elements have been identified by the same reference number with a letter suffix corresponding with the color involved, it is considered unnecessary to repeat the description of how the register outputs are produced and the shift accomplished.

The diodes 82Bk, 82W, 82R, 82B, 82G respectively pass to the line 83 the number of output pulses respectively produced by the converter shift registers 65Bk, 65W, 65R, 65B, 65G when interrogated by the clock pulses. When the total count equals the number of sub-elements per elemental area (4 in the particular case assumed), the counting pulses as transmitted via line 83 are effective, as later described, to initiate scanning of the next area of the master and the shift registers 65G–65Bk of converter 21, cleared as above described, are in readiness to receive the next group of control signals $C_G$, $V_B$, $C_R$, $C_W$, $C_{Bk}$ computed from the $E_G$, $E_B$, $E_R$ signals from such next area. If for any reason the registers are not cleared, all of their cores are reset to 0 by a reset pulse received by the driver 84 over line 85.

Figure 6:
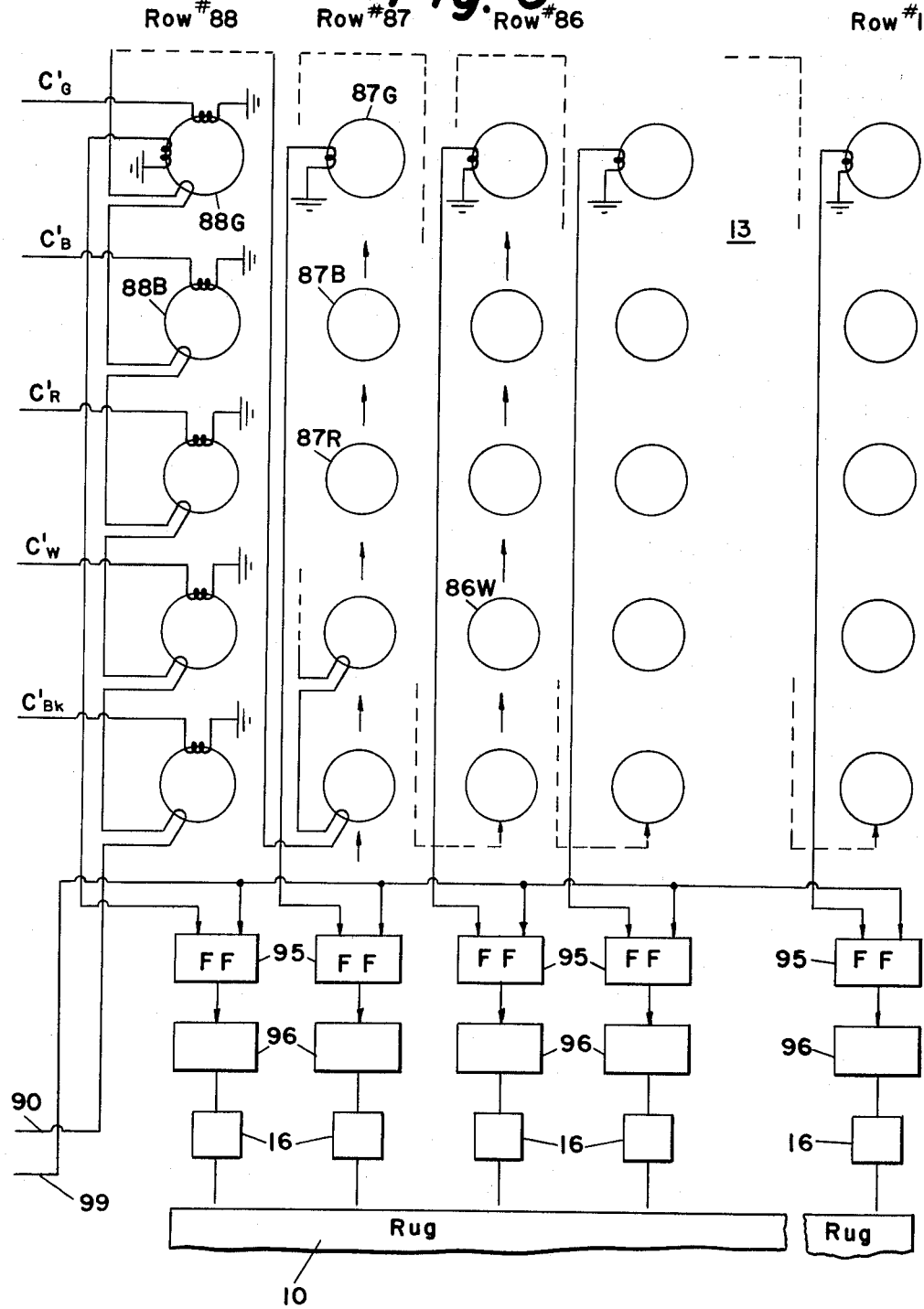
FIG. 6 is a block diagram of the arrangement for storing the digital signals of FIG. 5 and applying them when commutated in parallel to the needle heads or other bit applicators.

The particular static commutation arrangement 13 shown in FIG. 6 comprises as many rows of magnetic cores, flip-flops, or equivalent storage elements, as there are needle heads 16 or equivalent and the number of cores per row corresponds with the number of colors available as subelements or bits per elemental area. With needle heads of the type shown in my aforesaid application Serial No. 194,426, practical considerations dictate a needle-spacing of about 1¼" so that for a rug about 9 feet wide, there are used 88 needle heads and a corresponding number of rows of cores. To accommodate the five-color bit selection afforded by computer 14 and converter 21, the total number of cores in commutator 13 is therefore 440; all cores are connected in accordance with shift-register circuitry so that application of a shift pulse to line 90 advances all 1's stored in the cores in the direction indicated by the arrows.

The color information is fed into the commutator 13 one subelement at a time and shifted along the series of cores during line scanning so that at the end of a line scan there is a 1 stored in one and only one core of each row. The effective transfer of such color information for selection of the proper color by each of all of the needle heads is controlled by the time of deenergization of a magnetic clutch in each needle assembly. All clutches are engaged, in response to a pulse on line 98, as all needles disengage the cloth. The needle assemblies individually rotate through various angles dependent upon the previous color selection until each engages a stop at zero position. All clutches then slip for the remainder of the needle up-stroke. As the needle heads start down, all starting in the same angular position and with their clutches engaged, they are rotated through their various color positions as more fully explained in my aforesaid application Serial No. 194,426. The shift pulses supplied over line 90 to the cores of commutator 13 are in synchronism with the rotation of the needle heads. The clutch for each head 16 is released to effect the color selection for that head when the 1 stored in the corresponding row of the commutator cores is advanced to the final core of the row. For example, it will be assumed that 1's are stored in the first or black core 1B of Row #1, the second or white core 86W of Row #86, the third or red core of Row #87 and the fourth or blue core 88B of Row #88. Thus, upon application of the first shift pulse, the 1 in core 88B is advanced to the last core 88G of Row #88 whereupon the resulting output pulse, as applied to flip-flop 95 associated with that row, turns off the magnet 96 of the corresponding needle head 16 to select a blue bit of yarn. Similarly, upon application of the second shift pulse, the 1 previously stored in core 87R of Row #87 and advanced by the first pulse to core 87B is now advanced to the last core (87G) of Row #87 to effect selection of a red bit of yarn for the needle of Row #87. In like manner, the third and fourth shift pulses are respectively effective to transfer the 1's stored in cores 86W and 1Bk to the last cores of Row #86 and Row #1 to effect selection of a white and a black color bit by the corresponding needle assemblies. If a 1 is stored in any of the last cores 1G–88G, each corresponding clutch is already disengaged at the beginning of the needle down-stroke so that it selects a green bit.

At this point, it is expedient briefly to describe the application of successive subelements or bits by the particular bit-applying mechanism of FIG. 1. For each revolution of the cam shaft 98, all of the needle heads 16 reciprocate to apply a series of spaced color bits. For the first scan of a line of the master 11, their applied bits correspond in position with the subelement A of the reproduced picture elements Nos. 1, 6, 11, 16 etc. (FIG. 11A.) For application of the bits selected by the second scan, all of the needle heads 16 are rocked forward by a cam and link mechanism (not shown) associated with slide 22. The extent of such shift corresponds with one-half the width of an elemental area so that for the second reciprocation of the needle heads the applied bits correspond in position with the subelements B of the same picture elements Nos. 1, 6, 11, 16 etc. (FIG. 11B). Before application of the color bits selected by a third scan of the same line of the master, the slide 22 moves all needle heads to the right one-half the length of an elemental area and back one-half the width of an elemental area. Thus, when the third group of selected bits is applied by reciprocation of the needle heads, their positions correspond with those of subelements C of the reproduced picture elements Nos. 1, 6, 11, 16 etc. (FIG. 11C). Before application of the color bits selected by a fourth scan of the same line of the master, all of the needle heads 16 are again moved forward by one-half the width of an elemental area. Thus, for the fourth reciprocation of the needles, the bits applied correspond in position with subelements D of the reproduced picture elements Nos. 1, 6, 11, 16 etc. This completes the reproduction of picture elements Nos. 1, 6, 11, 16 etc. of a line (FIG. 11D).

For reproduction of picture elements Nos. 2, 7, 12, 17, etc. of that line, the needle head carriage 22 is shifted to the right by the width one picture element and the subelements A, B, C, D of the second series of picture elements are applied as above described (FIG. 11E). When all subelements of picture elements Nos. 2, 7, 12, etc. have been applied, the carriage 22 is again stepped to the right by width of one picture element and the subelements of picture elements Nos. 3, 8, 13, 18, etc. applied. This process is repeated until all subelements of all of the picture elements of a line have been applied (FIG. 11F). Typical needle slufters are shown in patents to Batty et al. 3,109,395 and Amidon 2,313,725. At that time the feedroll 23 (FIG. 1) is advanced by the width of an elemental area and the foregoing steps are repeated for the second line. During such advance of the feedroll, the carriage 22 moves all of the needle heads 16 back to their original position. For the second and subsequent even-numbered lines, the groups of subelements may be laid in the reverse order, i.e., the subelements of picture elements Nos. 5, 10, 15, 20 etc. for the first four scans; the subelements of picture elements Nos. 4, 9, 14, 19 etc. for the second scan and so on with the subelements of picture elements Nos. 1, 6, 11, 16 et seq. for the last four of the twenty-line scans. The decade counter 122 (FIG. 9) and its associated matrix 121 is interconnected with the exciter amplifiers 120A–120E alternately to effect forward and reverse line scanning.

Figure 9:
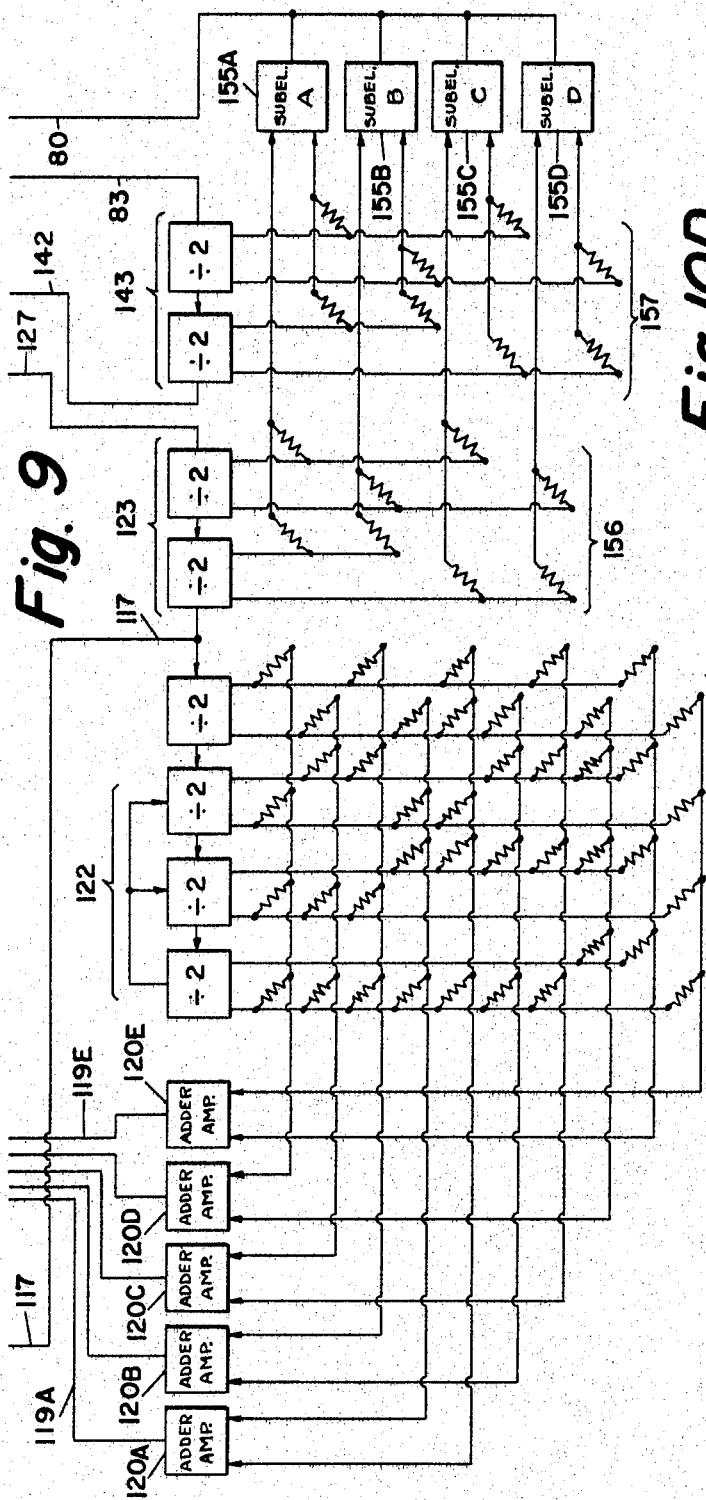
FIG. 9 is a block diagram of adder and divider circuits to effect skip-scanning by the arrangement of FIG. 5.

From the foregoing description of the mode of operation of the particular tufting mechanism 12, it will be understood that it requires that the scanner unit shall scan each line of the master twenty times, i.e., four times for each of the five groups of elemental areas. The scanning arrangement of FIG. 7 with the associated counting circuits of FIG. 9 is suited for such purpose.

Figure 7:
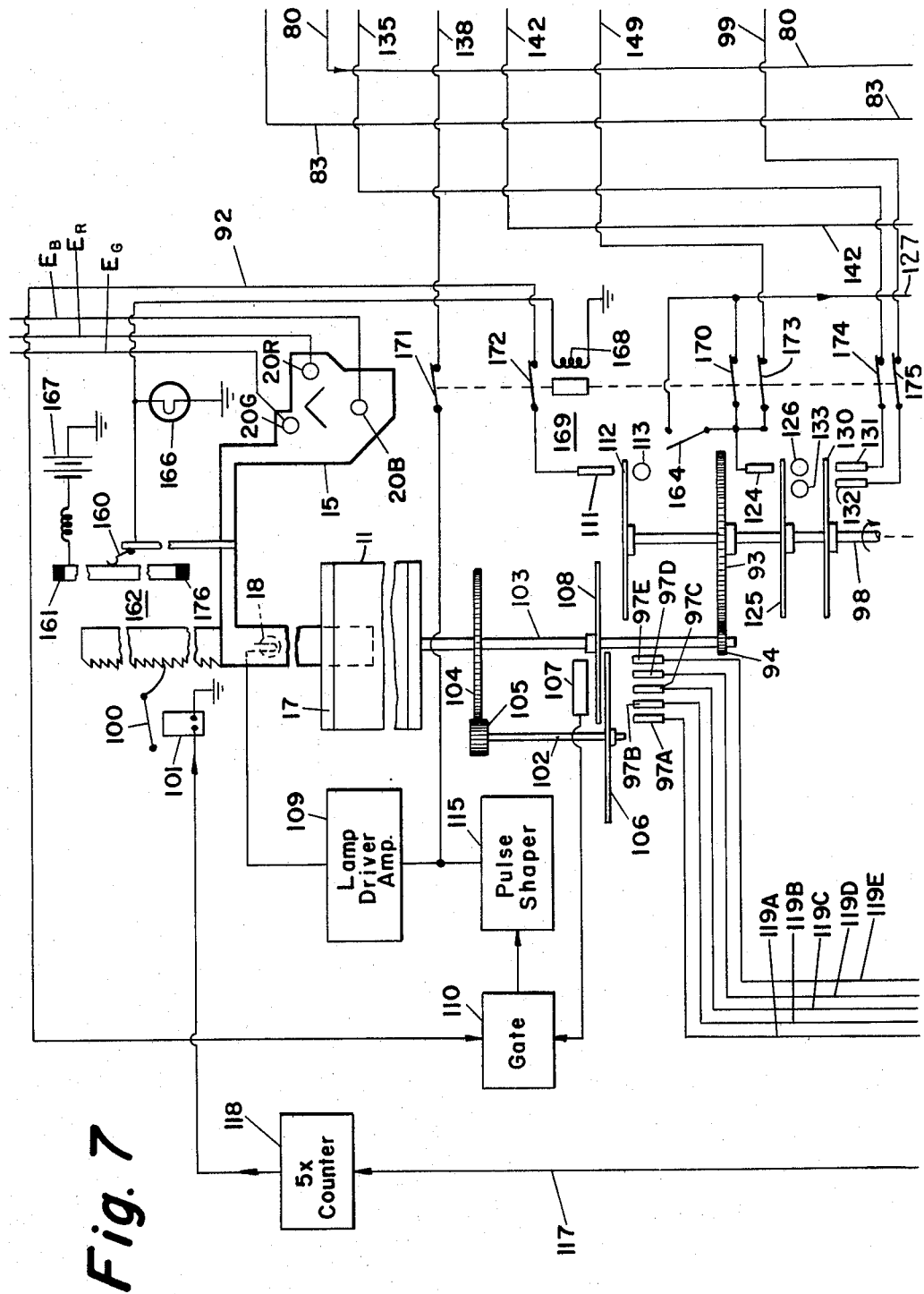
FIG. 7 shows a scanning arrangement for providing the input signals of the system of FIG. 4 and timing pulses.

Referring to FIG. 7, the scanner drum 17 is rotated in fixed time relation to the needle cam shaft 98 which makes one revolution per needle stroke. To effect scanning while the needles are engaging the cloth, i.e., during a time when the needle-selector means of necessity is idle, the shaft 103 of scanner drum 17 is driven at three times the needle shaft speed by gears 93, 94. Thus, the scanner drum makes one complete revolution for each 120° rotation of the needle shaft 98.

The scanning unit 15 including the lamp 18, the associated lens and prism system within the scanner drum and the photocells 20G, 20R, 20B externally of the drum is movable longitudinally of the drum by the stepping motor including magnet 101 and its armature pawl 100 under control of timing circuits later described.

The transparent master 11 is of such size, preselected by photographic techniques, that the area to be reproduced covers 75% of the periphery of the drum 17, leaving the remainder of the periphery free to accommodate clamping devices for securing the master to the drum. The lamp 18 is pulse-excited to flash 80 times (once for each needle position) for the corresponding 270° of a revolution of the drum. To that end, a commutator shaft 102 is driven at four times the speed of the drum shaft 103 by the gears 104, 105. The shutter disc 106 on shaft 102 rotates between photocell 107 and its exciter lamps including lamp 97A. The auxiliary disc 108 having 75% open area is also interposed between photocell 107 and lamp 97A and is attached to shaft 103. By properly phasing the disc 108 on shaft 103, the output pulses of photocell 107 span the time for scanning of a line of the master 11.

Figure 10E:
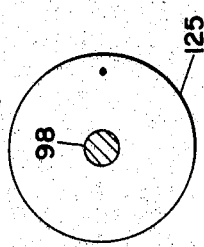
FIGS. 10A–10E are detail views of commutator discs of FIG. 7.
Figure 10D:
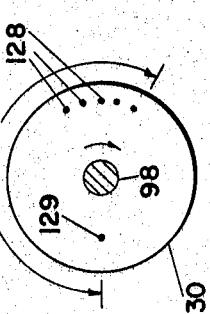
Figure 10C:
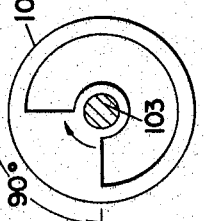
Figure 10B:
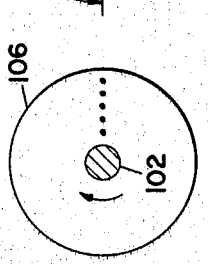
Figure 10A:
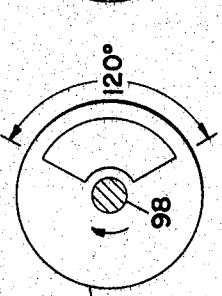

As thus far described, such pulses would occur for every revolution of drum 17. To preclude operation of the light-pulsing arrangement except for a particular 120° of the needle cam shaft, the output pulses of photocell 107 are not applied directly to the light-driver amplifier 109 but to the electronic gate 110. The other input circuit of the gate 110 is enabled by the output of photocell 111. The disc 112 attached to the needle cam shaft 98 rotates between photocell 111 and its exciter lamp 113. As shown in FIG. 10A, the cut-away area of disc 112 is 120° in angular extent. For this period during which the needles are laying previously preselected tufts or loops, the output of photocell 111 as applied via line 92 to gate 110 permits the output pulses of photocell 107, after peaking by the pulse shaper 115 and amplification by the driver 109, to produce flashing of the scanning lamp 18.

With the arrangement of FIG. 7 as thus far described, each fifth elemental area of a line of the master is illuminated by a light flash from lamp 18 to produce for each such area the $E_G$, $E_R$, $E_B$ signals representative of the color components of that area. Thus, at the beginning it scans picture elements 1, 6, 11, 16 etc., scanning each four times. Similar scanning of the remaining picture elements of a line is effected by shifting the phase of the lamp flashes with respect to the angular position of the master. To that end, the disc 106 is provided with four additional rows of holes each respectively associated with a corresponding one of the exciter lamps 97B–97E. As more clearly shown in FIG. 10B, each of the five rows consists of 32 holes and the holes of each row are angularly advanced with respect to the holes of the preceding row by ⅕ of the hole spacing. Thus, with each lamp selectively energized from lines 119A–119E only one row of holes of disc 106 is illuminated at a given time in the operating cycle and the phasing of scanner lamp 18 may be switched in five equal increments.

Just before the phasing of the scanner lamp is changed, the counter 118 in circuit with the stepping motor 101 receives an input pulse over line 117. After all elemental areas of a line of the master have been scanned, the fifth input pulse to counter 118 is effectively applied through motor 101 to advance the scanning unit 15 by the width of one line for scanning of its elemental areas.

The timing of the input impulses to counter 118 for controlling the time-stepping of motor 101 and the timing of the selective energization of the exciter lamps 97A–97E are derived from the output pulses of the photocell 124. The shutter disc 125 rotatable with the needle cam shaft 98 permits the photocell 124 to be illuminated by exciter lamp once for each revolution of shaft 98, i.e., once for each reciprocation of the needle heads 16. The pulses are supplied via line 127 (FIGS. 7 and 9) to the counter 123 whose output stage for each four input pulses produces an output pulse applied over line 117 to the counter 118 (FIG. 7). Thus, after photocell 124 has produced twenty output pulses, the counter 118 produces an output pulse which as applied to stepping motor 101 advances the scanning unit 15 by the width of one line.

For each four output pulses of photocell 124, the counter 123 also supplies an input pulse to the decade counter 122. The matrix 121 associated with the stages of counter 122 provides the switching levels for the gated amplifiers 120A–120E whose outputs are respectively applied via lines 119A–119E to the exciter lamps 97A–97E for photocell 107. With the scanner unit 15 set to a new line position, the counter 122 starts with a matrix level for which the amplifier 120A provides excitation to lamp 97A. Upon completion of the next first four revolutions of needle shaft 98 (i.e., upon completion of one revolution of drum 17), the counter 122 receives an input pulse from counter 123 to shift the switching levels in matrix 121 so that amplifier 120A is gated to the OFF state to turn off lamp 97A and amplifier 120B is gated to the ON state to turn ON exciter lamp 97B. Similarly, upon completion of the next four revolutions of shaft 98, the lamp 97B is turned OFF and lamp 97C turned ON. Thus, at the end of twenty revolutions of shaft 98 (i.e., five revolutions of drum 17), the scanning cycle for one line of the master has been completed; each of the picture elements 1, 6, 11, 16 etc. having been scanned four times for the first four revolutions; each of the picture elements 2, 7, 12, 17 etc. having been scanned four times for the second four revolutions and so on.

Figure 8:
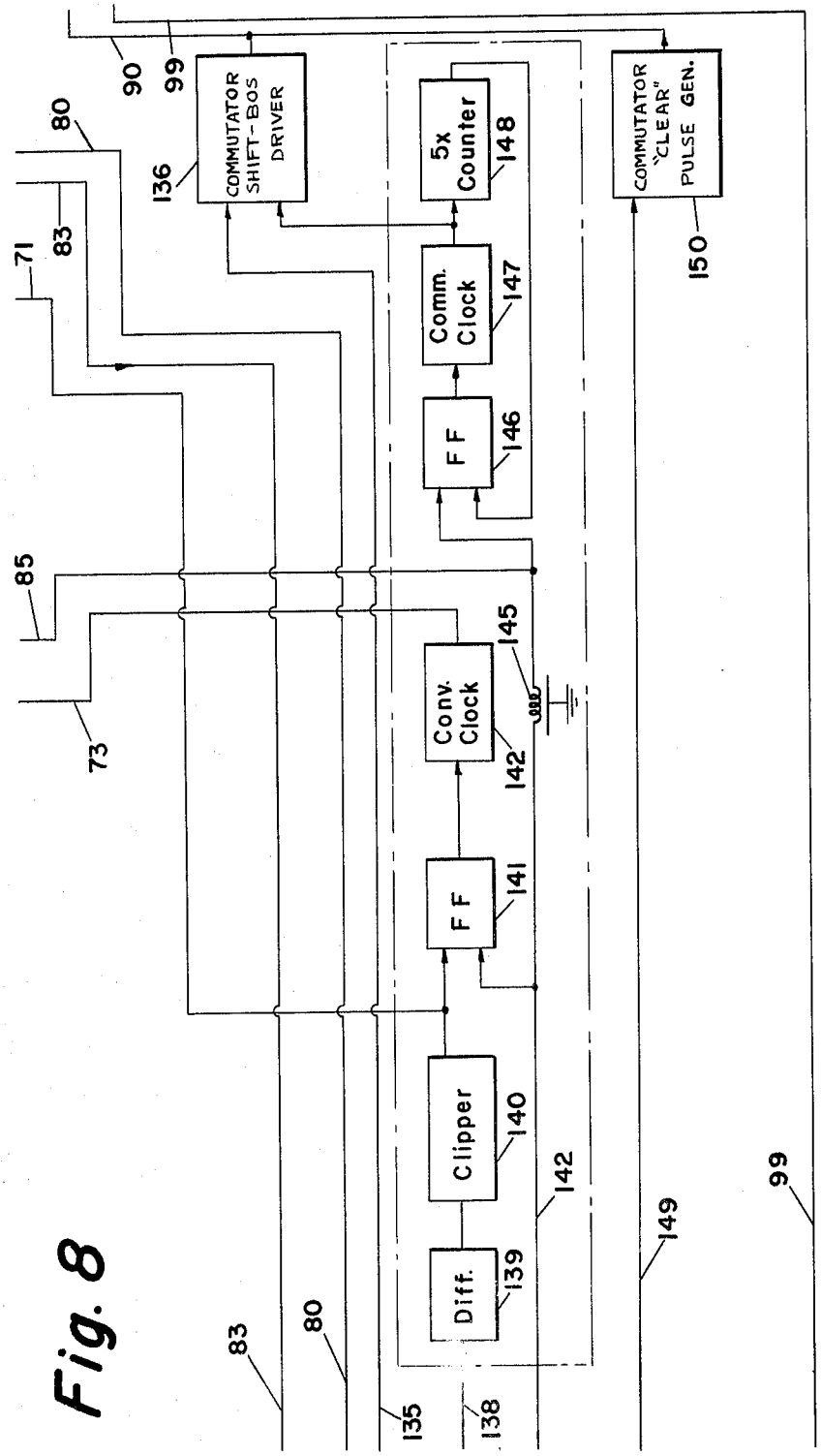
FIG. 8 is a block diagram of clock circuits controlled by the scanning mechanism of FIG. 7 and for producing timing signals for the converter of FIG. 5 and the storage device of FIG. 6.

To the needle cam shaft 98 is also attached the shutter or commutator disc 130 (FIG. 10D) interposed between the photocells 131, 132 and their respective exciter lamps 126, 133. The photocell 131 produces five pulses per revolution of shaft 98 from the group of five holes 128. These pulses are applied via line 135 to the commutator shift-bus driver 136 (FIG. 8). The photocell 132 produces one pulse per revolution of shaft 98 from hole 129 of the disc 130. The pulses are applied via line 99 to the "magnet-engage" flip-flop circuits 95 of FIG. 6 as may be traced from FIGS. 7, 8 and 6.

The pulse output of gate 110 (FIG. 7) as controlled by photocells 107 and 111 not only controls the flashing of the scanner lamp 18 as above described but also, as appearing on line 138 and as sharpened and amplitude-limited by the differentiating and clipping circuits 139 and 140 (FIG. 8), provides the converter start signal supplied over line 71 to the flip-flop 72Bk of the converter 21 (FIG. 5). This Start signal as applied to flip-flop 141 (FIG. 8) also turns on the clock-pulse generator 142 providing the interrogation pulses supplied via line 73 to the converter 21. The repetition frequency of the pulses produced by clock 142 is suitably high, of the order of 25 kc./sec.

The converter-clock 142 is stopped when the flip-flop 141 is returned to its original OFF state by a converter stop-pulse applied to it over line 142. As may be traced through FIG. 7 to FIG. 9, this converter stop-pulse is the output pulse of the counter circuit 143 which receives input pulses via line 83 of converter 21, FIG. 5. As previously described in connection with FIG. 5, a pulse appears on line 83 each time any one of its output gates 70G–70Bk is opened. Thus, after the clock 142 has produced sufficient interrogation pulses to result in four output pulses of converter 21, the converter pulse clock 142 is stopped.

After a brief delay, of say 5 microseconds introduced by delay line 145, the converter stop-pulse is applied via line 85 to the reset driver 84 (FIG. 5) of the converter to insure that all cores of the registers 65G–65Bk are in the 0 state before the next scanning operation. The delayed converter stop-pulse is also applied to turn ON the flip-flop circuit 146 to start the second clock 147 which, at suitably low rate, generates pulses applied to the second input circuit of the commutator shift-bus driver 136. Each time the needle-cam shaft 98 (FIG. 7) makes a revolution, the output of photocell 131 gates the driver 136 (FIG. 8) to pass five output pulses from clock 147 via line 90 to shift all 1's in the cores of commutator 13 (FIG. 6) to the next row. Each group of five pulses as totaled by the counter circuit 148 (FIG. 8) produces a single pulse which turns OFF the flip-flop circuit 146 to stop the commutator clock 147.

After the color information stored as 1's in the commutator cores has been transferred to the needle-heads 16 or equivalent, the commutator "clear" pulse-generator 150 (FIG. 8) is turned ON via line 149 by the output of photocell 124 (FIG. 7). In the interval for which it is turned ON, the number of pulses supplied by generator 150 over line 90 is sufficient to shift all of the 1's out of the series of the shift-register cores of commutator 13. The commutator 13 is thus in readiness to receive from converter 21 the color information for the subelements to be applied in the next cycle of the needles.

The timing of the output gates 70G–70Bk of the converter to supply such subelement information to commutator 13 is controlled by the appropriate one of the coincidence circuits 155A–155D (FIG. 9) whose output circuits are connected by line 80 to one input terminal of each of the gates 70G–70Bk. Each of the coincidence circuits 155A–155D has two input terminals, one connected to the matrix 156 associated with the two stages of counter 123 whose input pulses, one per revolution of needle-cam shaft 98, are supplied over line 127 by photocell 124 (FIG. 7) and the other connected to the matrix 157 associated with the two stages of counter 143 whose input pulses are supplied over line 83 from converter 21.

To start operation of the system, the pawl 100 of the stepping motor 101 (FIG. 7) is released from the associated rack of the scanning unit 15 which is moved longitudinally of the scanner drum until brush 160 rests upon the insulating segment 161 of the cut-off commutator 162. The reset switch 164 is momentarily closed to insure that all flip-flops, registers and other components are in correct state for starting. The loom motor may now be started but further action is delayed until the motor has come up to speed because relay 169 is open interrupting certain critical timing circuits. When the operator has determined that the motor is up to speed, the start switch 164 (FIG. 7) may be closed. This completes a circuit from the photocell 124 over line 127 to the counter 123 (FIG. 9). Thus, for every 20th needle stroke, the counter 118 (FIG. 7) energizes stepping motor 101 to advance the scanner unit 15 by one line of the master 11 on drum 17.

After a few lines, the brush 160 rides onto the conductive segment 165 of cut-off commutator 162 to complete a circuit from current source 167 through signal lamp 166 and also to complete an energizing circuit for the coil 168 of relay 169. The resulting closure of contact 170 of relay 169 provides a by-pass circuit for the Start button switch 164 which may now be released and the closure of relay contacts 171–175 complete the critical timing circuits to the lines 138, 92, 149, 135 and 99 for operation of the system as above described. Upon completion of scanning of all lines of the master 11, the brush 160 rides onto the insulating segment 176 of the cut-off commutator 162 to deenergize the relay 169 and the signal lamp 166. This interrupts the critical timing circuit and operation ceases. The operator may now shut down the loom motor.

If another length of carpet having the same design is to be made, the scanning unit 15 is returned to its Start position and another weaving cycle initiated as above described; if otherwise, the master 11 is replaced on the scanner drum 17 by another of the desired design.

Figure 12:
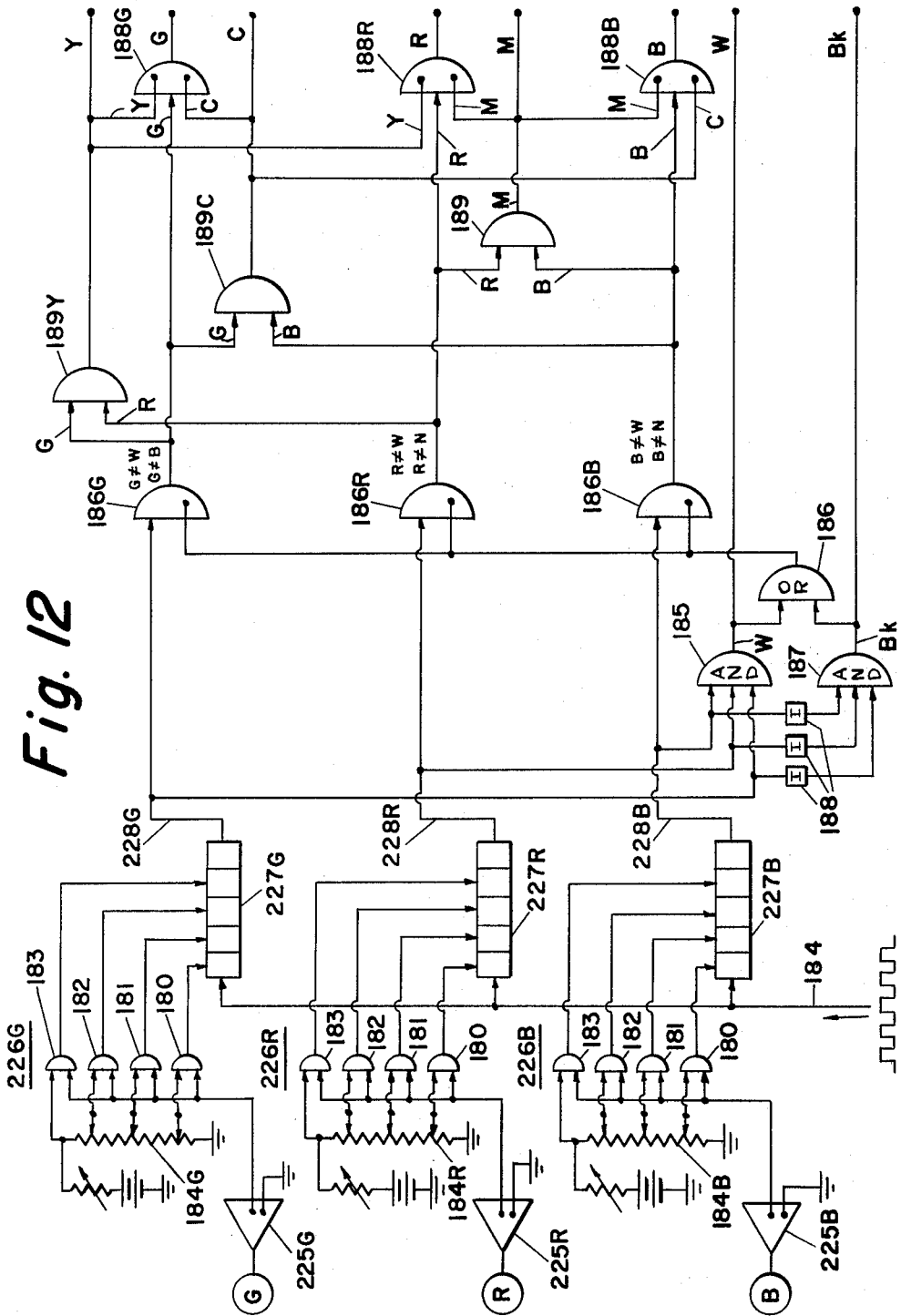
FIG. 12 is a block diagram of a computer-converter arrangement.

Another color-computer and converter arrangement suited for the basic systems of FIG. 1 is shown in FIG. 12. As in the computer of FIG. 4, the $E_G$, $E_R$ and $E_B$ signals from the scanner 15 are respectively applied to amplifiers 225G, 225R, 225B to produce analog output signals, each of which is converted to quantized digital signals by a corresponding one of the comparators 226G, 226R, 226B each including a group of gates in number corresponding with the preselected number of subelements per incremental area of the manufactured article 10. It is again assumed for purpose of explanation that the number of subelements is 4 but that the colors to be applied additionally include magenta, cyan and yellow.

Specifically, the output of amplifier 225G is applied to one input terminal of the gates 180–183 of comparator 226G. The other input terminals of the gates 180–183 are connected to the potential-divider 184G for application of fixed bias voltages corresponding with different intensity levels of green. The output terminals of the gates 180 et seq. are connected to successive stages of the Green shift-register 227G. Thus, if the magnitude of $E_G$ is less than the bias level set for gate 180 for application of a single green tuft, none of the gates 180–183 is opened and all stages of register 227G contain a 0; if the magnitude of $E_G$ is at least equal to the bias level for gate 180 but less than the bias for gate 181, the gate 180 is opened and the first stage of register 227G contains a 1. Similarly, if $E_G$ is at least equal to the bias of gate 181 but less than the bias of gate 182, the gates 180, 181 are opened and the first two stages of register 227G contain a 1 and so on.

In like manner, for each scan of an incremental area of the master 11, the registers 227R, 227B will each contain a four-digit number representing the quantized level of red and blue respectively.

To read out the color information stored in the registers 227G, 227R, 227B for computation of the number of tufts of each color to be applied to the corresponding elemental area of the manufactured article, a series of shift pulses is applied to the registers in parallel. It will be understood that upon application of a shift pulse, all digits stored in each register are shifted one stage to the right. For each read-out pulse, each of the register-output lines 228 has either a 1 or 0 level on it, and this pattern, as now explained, uniquely determines upon which one of the output lines Y, G, C, R, M, B, W, Bk there appears a color signal for one of the subelemental areas.

When, for example, the signal pattern on lines 228G, 228R, 228B is 1–1–1, all input circuits of the white AND gate 185 are enabled so that the gate opens and a signal appears on the White-ouput line W of the computer. The output signal of gate 185 is also applied through the OR gate 186 as an inhibit signal for the gates 186G, 186R, 186B.

When the signal pattern on lines 228G, 228R, 228B is 0–0–0, all input circuits of the Black AND gate 187 are enabled through the signal inverters 188 and a signal appears on the Black-output line Bk. As a precautionary measure, the output signal of gate 187 may also be applied through the OR gate 186 as an inhibit signal for the gates 186G, 186R, 186B.

When the signal pattern on lines 228G, 228R, 228B is 1–0–0, neither of the gates 186G, 188G is inhibited and consequently a signal appears on the Green-output line G. Similarly, when for any read-out pulse the signal pattern of the outputs of registers 227G, 227R, 227B is 0–1–0, neither of gates 186R, 188R is inhibited and a signal appears on the Red-output line R: likewise if the register output pattern is 0–0–1, neither of gates 186B, 188B is inhibited and a signal appears on the Blue-output line B.

When for any read-out pulse the output signal pattern of registers 228G, 228R, 228B is 1–1–0, both input circuits of gate 189Y are enabled so opening this gate and providing a signal on the Yellow-output line Y. The output signal of gate 189Y is also applied as inhibit signals for gates 188G, 188R so that no signal appears on either of the Green-output or the Yellow-output lines. Similarly, when the pattern on the register output lines 228G, 228R, 228B is 1-0-1, both input circuits of gate 189C are enabled to produce a signal on the Cyan-output line C. The output signal of gate 189C is also applied as inhibit signals for gates 188G and 188B so that no signal appears on either of the Green-output or Blue-output lines. Similarly, when the pattern on lines 228G, 228R, 228B is 0-1-1, both input circuits of the AND gate 189M are enabled to produce a signal on the magenta-output line M and to apply inhibit signals for the gates 188R, 188B so that no signal appears on the Red-output or Blue-output lines.

From the foregoing, it should be understood that for one series of read-out pulses the red, green and blue information derived from scanning of one elemental area of the master pattern 11 and stored in the stages of registers 227G, 227R, 227B is converted into a group of four color bit signals. For example, if the magnitudes of $E_G$, $E_R$, $E_B$ are respectively 3, 2 and 1, the digits stored in the registers 227G, 227R, 227B are respectively 1-0-0-0, 1-1-0-0 and 1-1-1-0. Thus, for the first read-out pulse, a signal appears only on the Black-output line Bk; for the second read-out pulse, a signal appears on the Blue-output line B; for the third read-out pulse, a signal appears on the magenta output line M; and for the fourth read-out pulse, a signal appears on the White-output line W. A table similar in character to Table A but of greatly expanded size can be made to show all of the various four-bit combinations of the eight available tuft colors which result from all of the possible combinations of the values of the $E_G$, $E_R$, $E_B$ signals as quantized and stored in the shift registers 227G, 227R, 227B.

It will be understood that use of the analyzer of FIG. 12 in a system similar to that of FIGS. 4 to 9 requires modification of the subsequent circuitry. For example, all of registers 65G, 65B, 65R, 65W and 65Bk would have four cores or stages and additional four-stage registers for the yellow, cyan and magenta output signals of FIG. 12 would be included. Also each row of cores of the static commutator 13 of FIG. 6 would include three additional cores for the yellow, cyan and magenta control signals.

What is claimed is:

1. A method of reproducing in a manufactured article the color and design of a photograph, painting or other graphic pattern which comprises storing a limited fixed number of a plurality of colors of bits of material for selective application at each of a multiplicity of stations positioned in correspondence with elemental areas of said article, analyzing the color components of all of said elemental areas of the pattern, for each analysis producing a group of signals predetermining for each of the corresponding stations a particular combination of a fixed numbers of color bits of material, and sequentially applying said particular combination of color bits of material as subelements of an elemental area of the article to give the visual impression of a single-color reproduction of the corresponding elemental area.

2. A method as in claim 1 in which the positions of all of said multi-color storage stations are concurrently slightly shifted a number of times in accordance with the location and number of subelements per elemental area, and in which for each position of all stations color bits, each in accordance with one of the corresponding group of signals, are concurrently applied as subelements of corresponding elemental areas of the article.

3. A method as in claim 1 in which the number of said multi-color storage stations is proportional to the number of elemental areas per line of the pattern, in which the incremental areas of the pattern are analyzed in line sequence, and in which signals sequentially produced for each pattern line are stored and subsequently concurrently utilized at all of said stations each for application of a bit of predetermined color as a subelemental area of the article.

4. A method as in claim 1 in which the multi-color storage stations are uniformly spaced and in number are a fixed fraction of the number of incremental areas per line of the article, in which the location of all stations is advanced, per line of the pattern, a number of times dependent upon the reciprocal of said fraction, in which for each location of said stations the spaced elemental areas of the corresponding pattern group are color-analyzed in line sequence a number of times equal to the number of subelements per elemental area of the article, in which the groups of signals sequentially produced for each line-sequence analysis are stored, and in which the corresponding signals of each group are concurrently utilized at all stations each for application of a bit of predetermined color as a subelemental area of the article.

5. A method of reproducing in a manufactured article the color and design of a photograph, painting or other graphic pattern which comprises storing bits of differently colored material including at least the colors green, red, blue, white and black for application at each of a multiplicity of stations positioned in correspondence with elemental areas of said article, photo-electrically analyzing light from elemental areas of the pattern to produce per analyzed area a group of electrical signals respectively representative of the green, red and blue components thereof, electronically computing from the signals of each group and their algebraic sums a group of control signals for a corresponding one of said stations and predeterminative of the number of each of the differently colored bits to be there applied as subelements of the article, and sequentially applying said predetermined number of each of the differently colored bits as subelements of the article to reproduce the corresponding pattern area.

6. A method as in claim 5 in which the computation of a group of control signals includes quantizing the individual signals to integer values including zero and whose sum for the group is equal to the number of subelements per elemental area of the article.

7. A method as in claim 6 in which the quantized control signals of each group are converted from analog to digital form for storage and subsequent utilization concurrently with the other groups of stored signals for the same line of the pattern in reproduction of the corresponding line of the article.

8. A method of reproducing in a manufactured article the color and design of a photograph, painting or other pattern which comprises intermittently feeding a backing layer, storing a limited fixed number of colors of bits of material for applications at each of a multiplicity of stations spaced in direction normally of the direction of feed of said backing layer, in the interval between successive feeding movements of said backing layer performing the steps of sequentially photo-electrically analyzing successive elemental areas of a line of the pattern to produce per analyzed area a group of electrical signals respectively representing the intensity of primary components of the color thereof, electronically computing from the signals of each group and their algebraic sums a group of bit-selection control signals for a corresponding area of said stations and determinative of the combination of color bits there to be next applied to the backing layer as subelements of an elemental area of the article.

9. A method as in claim 8 in which in the interval between successive feeding movements of the backing layer the point of bit-application at each of said stations is slightly shifted in accordance with the location and number of subelements per elemental area of the article, in which each elemental area of the pattern is analyzed a number of times corresponding with the number of subelemental areas per elemental area of the article, and in which for each analysis of each area a particular one of the corresponding group of control signals is chosen for selection of the next bit to be applied at the corresponding station as a subelement of the elemental area there to be reproduced.

10. A method as in claim 8 in which in the number of stations is a fixed fraction of the incremental areas per line of the article, and in which in the interval between successive feeding movements of the backing layer the location of said stations is advanced by the dimension of one elemental area across the backing layer a number of times equal to the reciprocal of said fraction.

11. A method of making a carpet, rug, tapestry or like textile article reproducing the color and design of a photograph, painting or other graphic pattern which comprises storing at each of a multiplicity of yarn-applying stations a fixed limited number of colors of yarn, intermittently feeding a backing layer in one direction to said multi-color storage stations for application at each of said stations of a number of bits of yarn as subelemental areas of an elemental area of the textile article, in the interval between successive feeding movements of said backing layer performing the steps of photoelectrically analyzing elemental areas of a line of the pattern to produce for each analyzed area a group of electrical signals respectively representing the intensity of primary components of the color thereof, and electronically computing from the signals of each group and their algebraic sums a group of bit-selection control signals determinative of the combination of yarn color-bits next to be applied at a corresponding one of said stations to the backing layer in reproduction of a corresponding elemental area of the pattern.

12. A system for reproducing in a manufactured product the color and design of a photograph, painting or other colored pattern which comprises feeding means for intermittently stepping a backing layer on which the pattern is to be reproduced, a row of mechanisms extending transversely of the direction of feed of said layer and in number corresponding with at least a fixed fraction of the total number of elemental areas across said pattern, each of said mechanisms comprising a group of devices each for applying a bit of corresponding differently colored material to said backing layer as a subelemental area of the reproduced pattern, means for scanning successive lines of the pattern in elemental-area sequence to produce for each elemental area analog signals respectively representative of the intensities of different primary components of the color of that elemental area, computer means for converting the signals for each elemental area into a group of digital control signals, one group for each of said mechanisms, means for storing all control signals resulting from each scan of the pattern in a register with each group in position correlated to that of the corresponding one of said mechanisms, and means operative between successive steps of said feeding mechanism simultaneously to actuate all of said mechanisms in a series of cycles during which one of the control signals of each group thereof selects one device of each of said mechanisms, the selected device upon completion of said series of cycles having applied their selected color bits to reproduce on said backing layer a line of elemental areas of the pattern.

13. In a system for duplicating the design of a pattern and for simulating the color of elemental areas in said pattern, including in combination, means including dichroic mirrors for determining the primary color components of said elemental areas along two coordinates of said pattern, photoelectric devices responsive to the light from said dichroic mirrors for converting said light into analog values of electric pulses corresponding to the color and value of each of said components, an electronic computer connected to said photoelectric devices for determining the relative values of red, blue, green, white and black subelements which would simulate each said elemental area, an electronic device for converting said relative analog values into digital values representing the intensity of said red, blue, green, white and black subelements, a magnetic shift register, a plurality of separate channels for storing one or more magnetic fields respectively representing said colors and intensities, a plurality of devices each including means for separately carrying materials of red, blue, green, white and black colors, and electromechanical means effectively connected between the output of said magnetic shift register channels and each of said plurality of devices for utilization of pulses derived from said channels to select said means for selective application of said colored material as subelemental areas in combinations reproducing elemental areas of said pattern.

14. In a system for reproducing a carpet with a color design corresponding to a color pattern, the combination of a scanning device for analyzing elemental areas of said pattern to derive therefrom the color components of each of said areas, means connected to an analyzing device for converting said components into electrical signals representative of the color and color values of said area components, quantizing means for deriving from said electrical signals a group of pulses representing the color and saturation of each component, magnetic shift registers having separate channels for respectively storing the pulses corresponding with a particular color and its value, a rug filament-looping device having rows of separate needles each threaded with a colored filament corresponding to each of said color components, needle-actuating means, and connections between said needle-actuating means and said magnetic shift registers for selecting the needle carrying the color filament corresponding to the stored pulses and for applying pulses to said needle-actuating means whereby rows of colored filaments corresponding to color components of different elemental areas of the pattern may be simultaneously looped through a backing material.

15. In a system for converting a color pattern into a carpet of the looped variety bearing the design of the said pattern and simulating said colors including, in combination, light-pulsing means for scanning the elemental areas forming a line across the width of said carpet, a color-determining means associated with said scanning means for separating light from each elemental area into electrical pulses representing red, green and blue component colors, quantizing means effectively connected to said associated means for deriving pulses of predetermined levels corresponding to each of said red, blue and green components and to their sums and to a reciprocal representing the absence of any color component, and a plurality of magnetic shift registers with separate channels respectively for said components, their sums, and said reciprocals for storing said pulses of predetermined levels whereby the separate channels represent the separate component colors and the number of pulses in the channel represents the value of said color, and a plurality of devices for selecting and actuating a needle of a group of needles in rows, the separate needles of each of said groups being assigned a thread corresponding to red, green, blue, white and black whereby the colors and color values of said elemental areas may be simulated by combinations of said threads.

16. Apparatus for reproducing in a manufactured article the color and design of a master pattern characterized by an arrangement for sequentially analyzing as to color successive elemental areas spaced along a line of said pattern and to produce during the color analyses of such areas a series of groups of electrical pulses, the pulses of each group representing the analog values of primary color components of a corresponding one of said pattern areas, computer circuitry operating upon the pulses of each of said group to convert them to integer signal values respectively representative of a fixed number of color bits which applied as subelements of a corresponding elemental area of the article simulate the same visual impression as the corresponding elemental area of the pattern, a static commutator for storing the integer values for all of said spaced elemental areas of a pattern line, and a plurality of bit-applying devices spaced along a line of said article concurrently operated to apply along said line color-bits each in accordance with a stored integer-valued signal stored in said commutator.

17. Apparatus according to claim 16 in which the color analyzing arrangement comprises a light source timed to scan the same series of spaced elemental areas of the pattern a plurality of times corresponding to the number of subelements per elemental area of the article and for shifting the timing to scan a plurality of different series of spaced elemental areas along the same line of said pattern whereby the spaces between the color bits applied to the article are filled in to complete a visual reproduction of the corresponding line of the pattern.

18. Apparatus for producing in a manufactured article the colors and patterns of a master composition, said apparatus comprising an arrangement for analyzing into a plurality of primary color components the color of a unitary elemental area of said composition, which area, when viewed from a normal viewing distance, gives the impression of a single color, means for deriving therefrom a plurality of electrical pulses each correlated to at least one of said plurality of primary colors of said area, and means responsive to each of said electrical pulses for sequentially applying to said article color bits of material respectively representative of primary color components of said unitary elemental area of the composition so that when said unitary elemental area of said article is viewed from a normal viewing distance it gives the impression of the same single color of the unitary elemental area of said composition.

19. Method for producing in a manufactured article the colors and patterns of a master composition, said method comprising analyzing into a plurality of primary color components the color of a unitary elemental area of said composition, which area, when viewed from a normal viewing distance, gives the impression of a single color, deriving therefrom a plurality of electrical pulses each correlated to at least one of said plurality of primary colors of said area, sequentially applying to said article response to each of said electrical pulses color bits of material respectively representative of primary color components of said unitary elemental area of the composition so that when said unitary elemental area of said article is viewed from a normal viewing distance it gives the impression of the same single color of the unitary elemental area of said composition.

20. A method of producing in a manufactured article, particularly a tufted carpet or the like tufted article, the colored pattern of a master composition, in which the colored pattern on the article is produced by applying thereto a large number of colored bits of material, particularly colored tufts of fibers, characterized by optically scanning elemental areas of the master composition and analyzing the color of each elemental area into a plurality of color components; deriving therefrom groups of electrical pulses respectively representative of the intensity of the respective color components of each of said areas, said pulses being electronically converted to color-significant signals of given values which respectively correspond to an appropriate one of a given relatively small number of colors; and using said color-significant signals as control values for picking out successively bits of the respective colors from a stock of colored bits of material and applying said bits to the respective elemental area of the article so as to successively form the elemental areas line after line on said article in accordance with the scanning of the master composition, the color impression afforded by an elemental area, as viewed from a normal viewing distance, being provided by the application of respectively a plurality of colored bits of material of like or different color according to the values of the corresponding color-significant signals.

References Cited by the Examiner

UNITED STATES PATENTS

| 876,562 | 1/1908 | Kleutgen | 112—79 |
| 1,234,398 | 7/1917 | Schwarzmann | 112—221 X |
| 2,058,095 | 10/1936 | Nakanishi | 139—319 |
| 2,354,843 | 8/1944 | Tandler et al. | 139—319 |
| 2,571,322 | 10/1951 | Yelland | 178—5.2 |
| 2,649,065 | 8/1953 | Casper | 112—79 X |
| 3,067,701 | 12/1962 | Wilcox | 112—79 |
| 3,135,828 | 6/1964 | Simjian | 178—5.2 |

FOREIGN PATENTS

| 219,393 | 1/1962 | Austria. |
| 602,615 | 8/1960 | Canada. |
| 974,738 | 2/1951 | France. |
| 974,739 | 2/1951 | France. |

JORDAN FRANKLIN, *Primary Examiner.*

DAVID J. WILLIAMOWSKY, *Examiner.*